United States Patent
Urias et al.

(10) Patent No.: US 6,202,487 B1
(45) Date of Patent: *Mar. 20, 2001

(54) LIQUID LEVEL DETECTING DEVICE INCLUDING A CONTAINER HAVING A FIRST RECEPTACLE AND A SECOND RECEPTACLE

(76) Inventors: Frank E. Urias, 1005 Bonnie Dr., Lafayette, LA (US) 70503; Robert E. Puckett, 123 Froeba Dr., Carencro, LA (US) 70520; Wendell Miller, 1214 Bird Song, Lafayette, LA (US) 70507

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,807

(22) Filed: Jul. 15, 1998

Related U.S. Application Data

(63) Continuation-in-part of application No. 08/696,508, filed on Aug. 14, 1996, now abandoned.

(51) Int. Cl.[7] ................................................. G01F 23/30
(52) U.S. Cl. ................................................................ 73/309
(58) Field of Search ............................. 73/307, 308, 309; 340/618

(56) References Cited

U.S. PATENT DOCUMENTS 5,482,249   1/1996   Schafbuch et al. ................... 251/118

OTHER PUBLICATIONS

Fisher Controls "Instruction Manual" for types 2100 and 2100E, pp. 1–12, Oct. 1992.

*Primary Examiner*—Harshad Patel
(74) *Attorney, Agent, or Firm*—Domingue & Waddell, PLC

(57) ABSTRACT

A device for signalling a predetermined height of fluid within a switching device is disclosed. The device includes a container having a first section, a second section, and a novel sealing assembly (operatively associated with the first and the second section) for sealing the fluid within the container. The device further includes a sphere, shaft and torque tube assembly (operatively associated with the first section) for measuring the fluid within the container, as well as valve member (operatively associated with the fluid level means) adapted for controlling a supply source. The device may be used as a high level switch or a low level switch, and is adaptable for pneumatic or electrical systems.

6 Claims, 14 Drawing Sheets

LIQUID LEVEL DETECTING DEVICE INCLUDING A CONTAINER HAVING A FIRST RECEPTACLE AND A SECOND RECEPTACLE

BACKGROUND OF THE INVENTION

This is a continuation-in-part application of our prior application, Ser. No. 08/696,508 filed Aug. 14, 1996 now abandoned, which is incorporated herein by reference. This invention relates to a level detector. More particularly, but not by way of limitation, this invention relates to a liquid level detector that operates a shut-down valve or alarm system when liquid in a vessel reaches a predetermined level.

During the production of oil and gas from well bores, the effluent thus produced from a hydrocarbon bearing reservoir will be a mixture of oil, gas and water. As will be well understood by those of ordinary skill in the art, the produced effluent will require processing in order to be transported, sold and refined.

In the processing of oil, gas and water, the operator will be required to separate the effluent into the three different phases, namely oil, gas and water. Many different types of separators have been devised in order to effectively separate the effluent. Due to the nature of production process equipment, the constant monitoring of the flow through the process equipment is required. If not monitored, the level in the process equipment may become either too high or too low. Both of these situations may result in dangerous conditions which ultimately may result in spillage or other type of hazardous situations.

In order to monitor the process equipment, numerous types of devices have been devised. One such device is commonly referred to as the level safety switch and is commercially available from Fisher Controls under the name "Type 2100 Pneumatic and Type 2100E Electric Liquid Level Switches".

However, the prior art devices suffer from several deficiencies. For instance, the switches are fabricated so that the container receiving the displacer assembly is forged in two pieces and welded into an integral unit. Thus, if the operator wishes to change the displacer (sphere and shaft), or simply check on the condition of the displacer on location, it is not possible to do so. Instead, the entire cage must be removed to service center. This results in down time of the process equipment, and/or shut-in of production which is not economically feasible.

Also, the sphere which is used as a float for the prior art displacers is a sealed container inside the cage; thus, the sphere may be penetrated by process fluid. The sphere may then retain pressure or hazardous fluid for an extended period. These conditions are highly undesirable which may result in personnel injury or environmental upsets such as fire or pollution. Another problem is that the unit can test good with saltwater because it floats in it, but it's too heavy to float in hydrocarbon liquid and will not function in actual service.

Therefore, there is a need for a level control device that is fabricated as a two piece container so that the operator may open up the device in order to perform routine maintenance and trouble shooting. There is also a need for a device that is truly a displacement unit and will not float in saltwater for dependable level safety switch applications. The invention herein set forth solves these, and other problems, as will be more fully set forth in the description of the novel liquid level detecting device that follows.

SUMMARY OF THE INVENTION

A device for signaling a predetermined height of fluid within a switching device is disclosed. The device includes a container having a first section, a second section, and seal means (operatively associated with the first and the second section) for sealing the fluid within the container. The device further includes a fluid level means (operatively associated with the first section) for measuring the fluid within the container, as well as valve means (operatively associated with the fluid level means) for controlling a supply source.

The device may further include a signal means, operatively associated with the valve means, for terminating the supply source to the valve means. In the preferred embodiment, the fluid level means comprises a sphere constructed of a stainless steel having a density greater than salt water that weighs 1.318 pounds (thereby generating a force), and a shaft operatively associated with the sphere. Also included will be the torque tube assembly, operatively connected to the shaft, that is responsive to the fluid level height within the container (acting as a torsional spring and responding to changes in buoyant force).

In the preferred embodiment, the torque tube assembly includes a block member attached to the first section of the container; a collar member operatively associated with the block, with the collar member receiving the shaft; a moment arm perpendicularly attached to the shaft; and, a flapper attachment, operatively associated with the moment arm and responsive to movement of the moment arm.

In one embodiment, the first section has a first sealing face, and the second section has a second sealing face. In this embodiment, the seal means includes: a gasket, with the gasket being positioned between the first sealing face and the second sealing face; and, a series of projections, contained on the first sealing face that cooperate with a series of grooves contained on the second sealing face.

The type of fluid within the container may be a mixture of oil and water, and in one embodiment, the container is fluidly connected to a separator means for separating an effluent from a well bore. The separator means separates the effluent into streams of oil, water and gas. Thus, the apparatus may further contain an alarm, with the alarm being activated when the pneumatic air source is exhausted in reaction to the torque tube assembly's relative position.

The device may have a signal means that includes an air supply so that as the valve means operates, the air supply is exhausted so that a signal is terminated. Alternatively, the device may have a signal means that includes an electric supply so that as the valve means operates, the electric supply is disconnected so that a signal is terminated thereby alerting the operator.

In a second embodiment herein disclosed, which is the preferred embodiment of this application, an apparatus for detecting a level of an effluent containing an oil composition and a water composition contained within a vessel will now be described. The apparatus comprises a container having a first receptacle, a second receptacle operatively attached with the first receptacle, and, a third receptacle operatively attached with the second receptacle.

The apparatus will also have a displacer assembly having extending therefrom a shaft. Also included is a block attached to the first receptacle and a collar member operatively associated with the block, with the collar member receiving the shaft. A torque tube assembly is perpendicularly attached to the shaft. A flapper attachment, operatively associated with the moment arm and responsive to movement of said torque tube assembly is also provided in the preferred embodiment.

The first receptacle includes a first passage and a second passage, and the third receptacle comprises a third passage and a fourth passage. In one embodiment, the first passage and the third passage are fluidly connected to the vessel. In another embodiment, the second passage and the fourth passage are fluidly connected to water supply lines and drain lines.

Also in one of the preferred embodiments, the first receptacle will have a first sealing face, the second receptacle will have a second sealing face and a third sealing face, and the third receptacle will have a fourth sealing face. In this embodiment, the apparatus further comprises a first gasket placed between the first sealing face and the second sealing face, and a second gasket placed between the third sealing face and the fourth sealing face.

The apparatus may further comprise a valve means, operatively associated with the flapper attachment, for exhausting a supply source; and a signal means, operatively associated with the valve means, for signaling the exhaustion of the supply source by the valve means to an alarm. In one embodiment, the signal means includes an air supply so that as the valve means disrupts the supply source, the air supply is exhausted. In another embodiment, the signal means includes an electric supply so that as the valve means disrupts the supply source, the electric supply is disconnected.

An advantage of the present invention includes having a cage container being constructed in two portions. Another advantage is the operator may disassembly the two portions at the process equipment site. Yet another advantage is that the operator may preform maintenance and repair on the displacer assembly at the process equipment site. Still yet another advantage is that the displacer assembly acts as a true displacer so that the sphere does not actually float in the effluent. Yet another advantage is that the novel design may be used in at least the upstream or downstream oil and gas industry.

Still yet another advantage is that the extension member may be used with input and output connections that are operatively associated with process flow vessels containing a mixture of oil and water. These input and output connections may require varying lengths due to the piping design. Therefore, the novel design allows utilization of the signaling device without having to restructure piping. This may be accomplished by selecting the desired distance between the connections and economically fabricating the extension member at the desired length. The extension member is then inserted between the first receptacle and second receptacle.

A feature of the preset invention is the novel seal design between the two portions of the container. Another feature is that the density of displacer makes the sphere heavier than the effluent. Still yet another feature is the serrated grooves and cooperating projections on the sealing face of the container portions provide for a novel sealing mechanism. Another feature includes utilizing a block member, with cooperating collar member, that is attached to the first section that allows for use of the disclosed displacer.

Yet another feature of the present invention includes having an extension member that can be easily custom fabricated to the desired length. Another feature is that the displacer assembly may be constructed as a sphere or cylindrical shape. The shape and length of the displacer assembly may be chosen based on design criteria such as level that the operator wishes to have the switch actuated.

Another feature is that different length floats may be used within the device, with the length of the device depending on level upon which the device is set to activate. Still yet another feature includes having a sealing faces on the extension member that cooperate with the sealing faces of the respective.

DETAILED DESCRIPTION OF THE PREFERRED EMBODIMENTS

Figure 1:
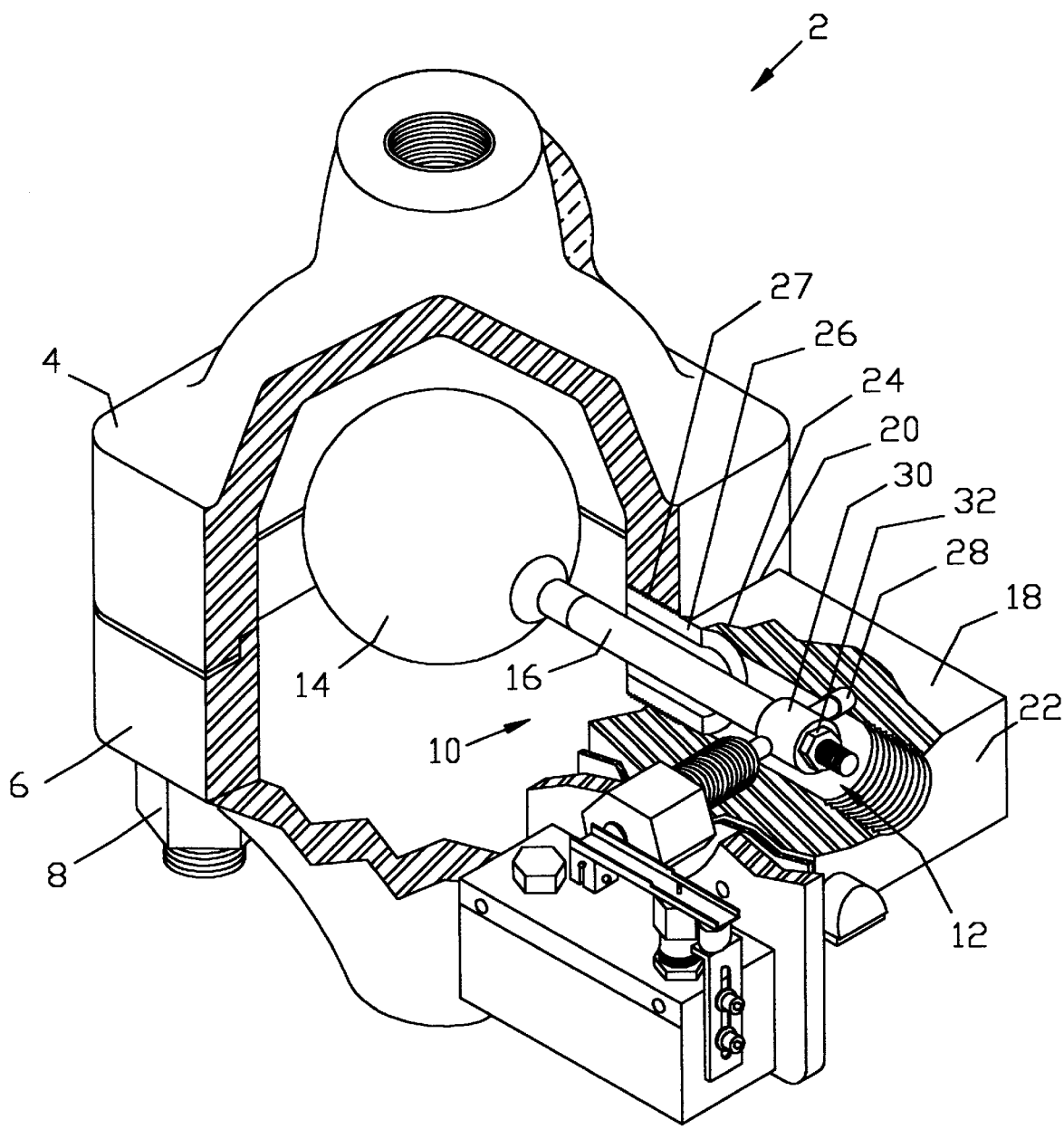
FIG. 1 is a perspective cut-away view of the first embodiment of the invention.

Referring to FIG. 1, a perspective cut-away view of the preferred embodiment of the invention adapted for measuring a low liquid level will now be described. The novel liquid level detecting device 2 will contain a first section 4 and a second section 6, with the sections 4, 6 being connected together via the bolt and stud means 8 for bolting the sections 4, 6 together.

The device 2 has contained therein the fluid level means for measuring the fluid within the container. As seen in FIG. 1, the device is configured for measuring a low liquid level. The fluid level means includes the displacer assembly (seen generally at 10) as well as the torque tube assembly (seen generally at 12). The displacer assembly 10 includes the sphere 14 that is connected to the shaft 16. In the preferred embodiment, the shaft is welded to the sphere. The sphere is constructed of a stainless steel having a density greater than salt water and weighs (generates a force) 1.318 pounds. If the container includes water therein, the water will generate a buoyancy of approximately 1.209 pounds; therefore, there is an over all downward force exerted by the sphere of 0.109 pounds even during testing of the device 2. Thus, the displacer is not a float, and the displacer assembly works as a true displacer.

As depicted in FIG. 1, the torque tube assembly 12 will include a block member 18 that is mounted and adapted to the first section 4. The block member 18 is essentially a rectangular box having a first end 20 and a second end 22. It should be noted that the block member 18 will be further described in FIG. 5. Returning to FIG. 1, the block member 18 has an aperture 24 that has contained therein the collar member 26, with the collar member 26 being adapted to be received within the aperture 27. The aperture 27 is located within the first section 4.

The torque tube assembly 12 further includes the moment arm 28 with the shaft clamp 30 being associated therewith helping to hold the moment arm 28 in place with the shaft 16 in cooperation with the nut and hex jam 32. The moment arm 28 will be described in detail in the description of FIG. 6.

Figure 2:
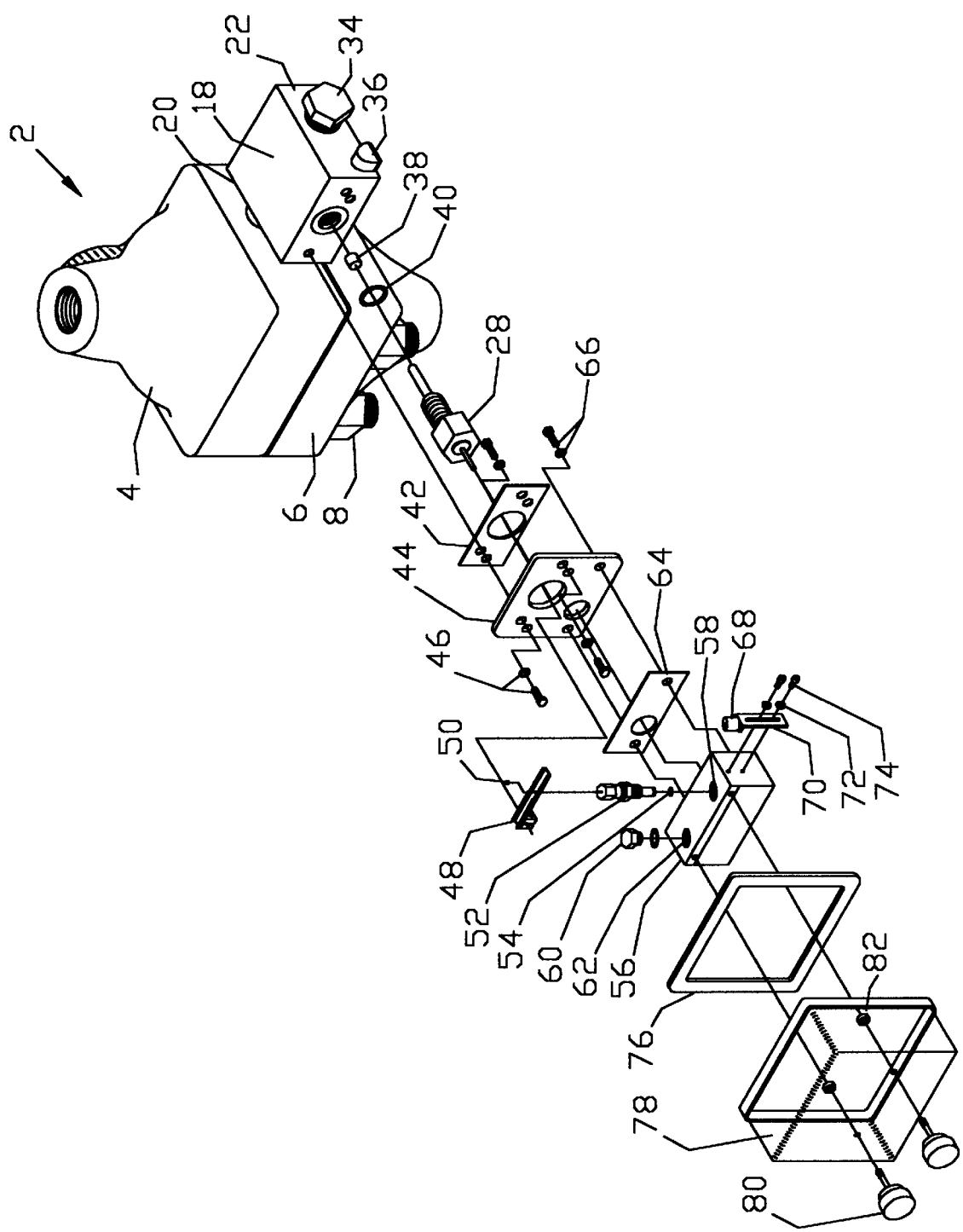
FIG. 2 is a disassembled view of the torque tube and valve means of the present invention.

Referring now to FIG. 2, a disassembled view of the moment arm and valve means of the present invention will now be described. It should be noted that like numbers refer to like components in the various drawings. As depicted, the block member 18 is attached to the first section 4 of the container. Also included with the block 18 is the pipe plug 34 and the vent assembly 36.

The moment arm 28 will have operatively associated therewith the bearing 38 and the o-ring 40. A body block gasket 42 is included that will cooperate with the back plate 44 that in turn have the cap screws and washers 46 for engagement. The flapper and clamp assembly 48 includes the flapper seat 50 that will cooperate with the nozzle 52. The nozzle 52 in turn has the o-ring 54 that cooperates with the nozzle block assembly 56, and in particular, within the opening 58, with the pressure plug and o-ring 60 also being included within opening 62. The nozzle block gasket 64 is associated with the back plate 44 and the nozzle block assembly 56 as shown. It should be noted that the cap screw with lock washer 66 cooperates with the back plate 44, nozzle block gasket 64 and nozzle block 56 as illustrated.

The nozzle block assembly 56 will have adapted thereto the magnet 68 and magnet bracket 70 along with the mounting screws/washers 72 and screw 74. The assembly thus described in FIG. 2 will then have the cover gasket 76 that cooperates with the cover means 78. The cover means 78 is attached to the nozzle block assembly 56 via the cover screws 80 and retained in place with retainer gaskets 82.

Figure 3A:
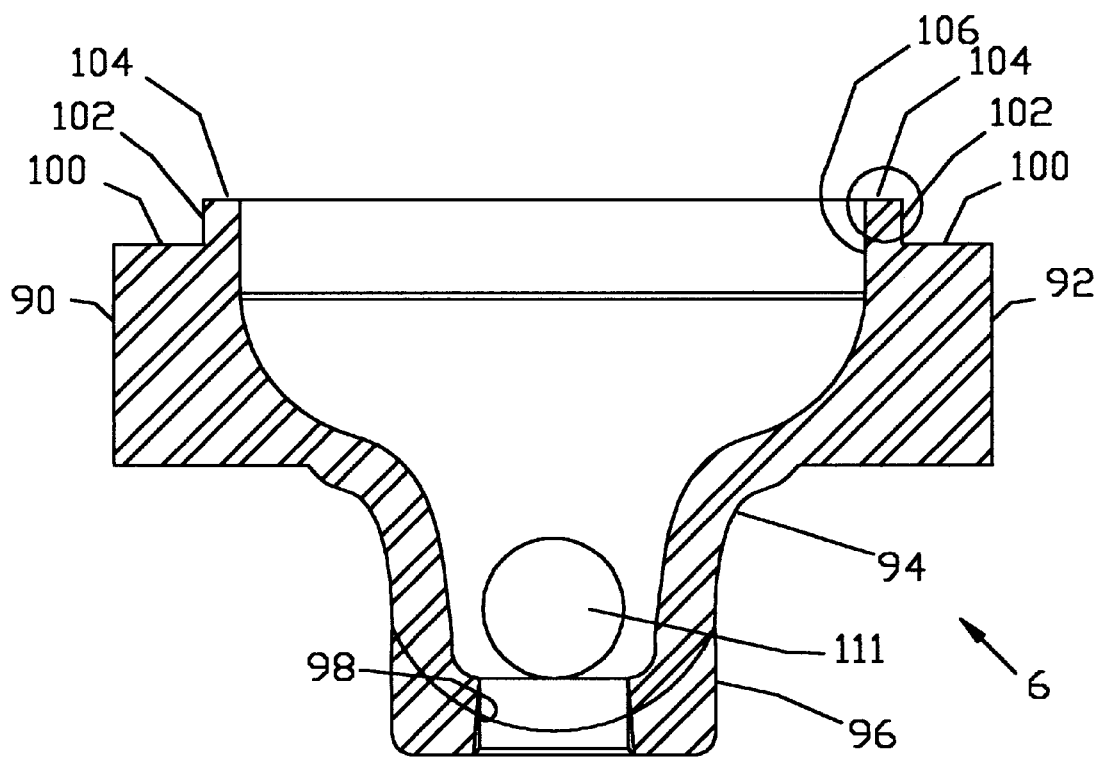
FIGS. 3A through 3C illustrate the lower section of the container of the present invention.
Figure 3B:
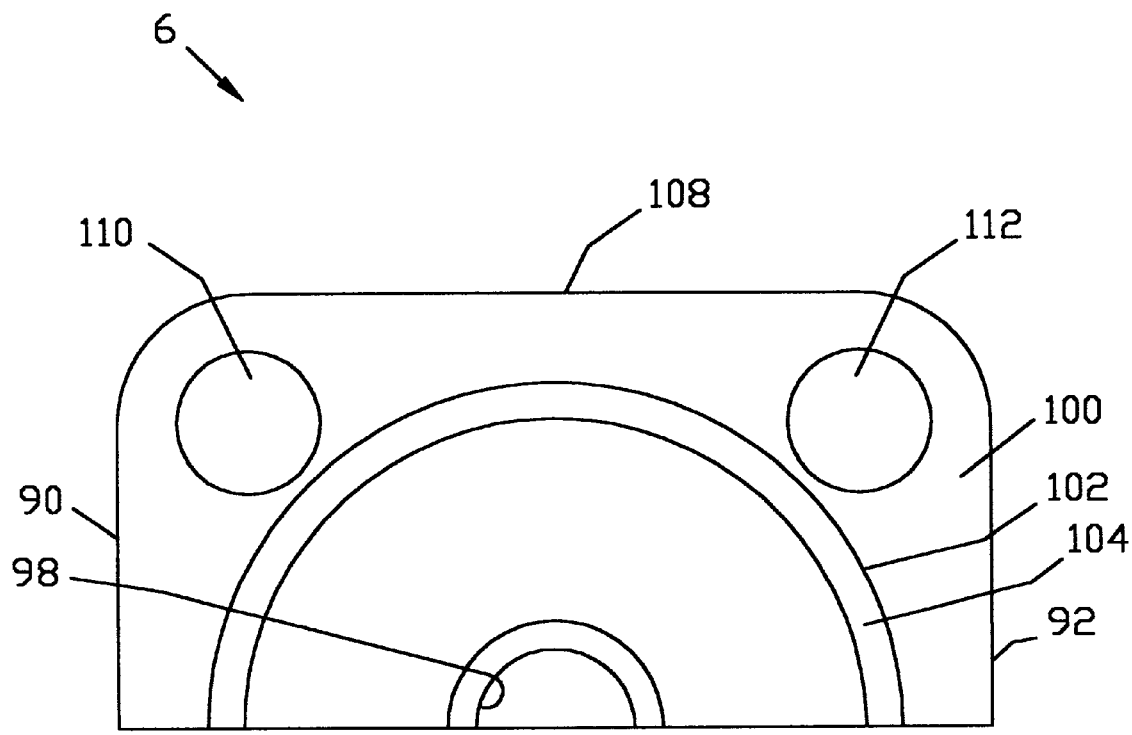
Figure 3C:
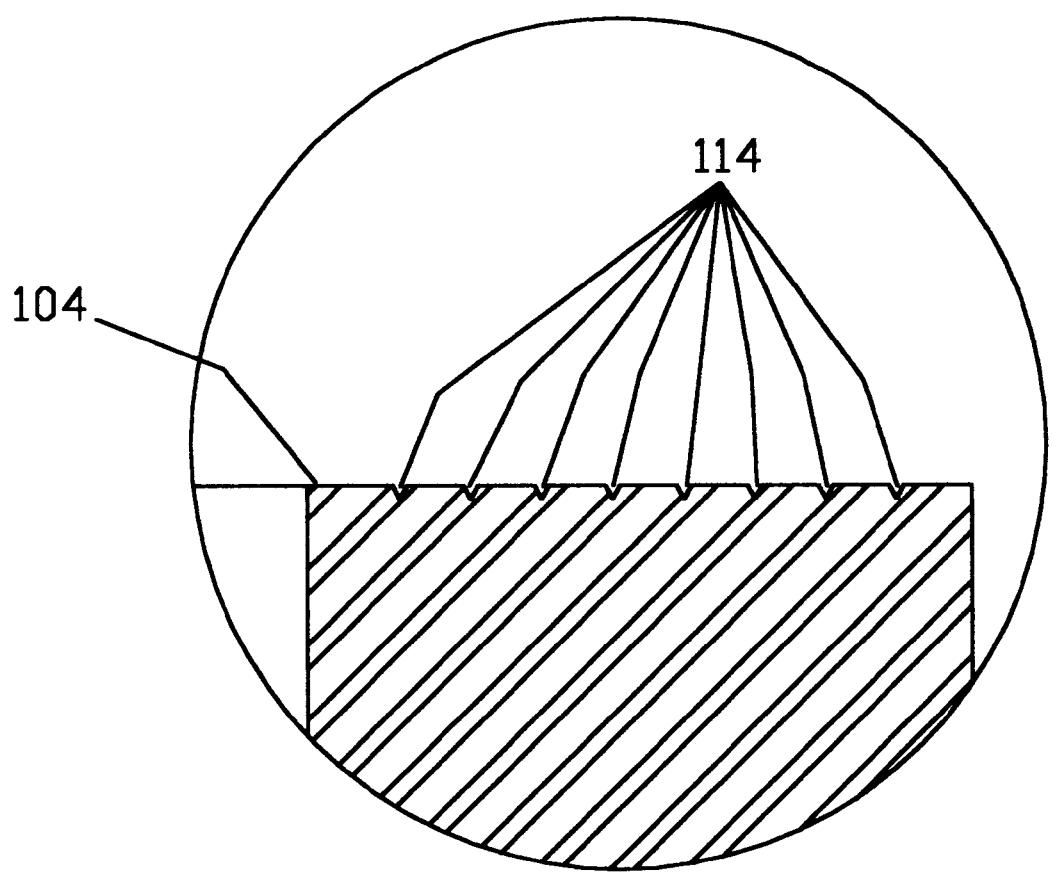

Referring now to FIGS. 3A–3C, the lower section 6 of the container of the present invention will now be described. The outer portion of the lower 6 and upper section 4 are generally in a rectangular shape, with the sides 90 and 92 being shown in FIG. 3A. The sides 90 and 92 will lead to the tapered neck portion 94, with the tapered neck portion 94 tapering to a cylindrical surface 96, with the cylindrical surface 96 having an inlet 111 for communicating the effluent with the interior of the container. The sides 90, 92 of the lower section 6 in the opposite direction will lead to the radial surface 100 that in turn leads to the cylindrical surface 102. The cylindrical surface 102 will then terminate at the radial sealing surface 104 that in turn leads to the internal surface 106. The radial sealing surface 104 will be further described in FIG. 3C.

With reference to FIG. 3B, the top view of the section 6 will now be described. The section 6 includes the previously described sides 90 and 92, and this view also depicts the side 108. Also depicted is the radial surface 100 that leads to the cylindrical surface 102 and in turn to the sealing surface 104. The figure also illustrates the openings 110 and 112 for placement of the bolt and nut means 8. Also, there is a bottom opening 98 for bottom drain or bottom entrance of the effluent.

FIG. 3C is a magnification of the radial sealing surface 104. The sealing surface 104 contains a series of concentric serrated grooves 114. In the preferred embodiment, the grooves are a distance of 0.03 inches apart with a depth between 0.003 to 0.005 inches. In operation, a gasket is placed intermediate the surface 104 and the cooperating sealing surface of the upper section 4. Hence, the sealing of the two sealing surfaces is enhanced since the composition of the gasket may be pressed into the grooves 114.

Figure 4A:
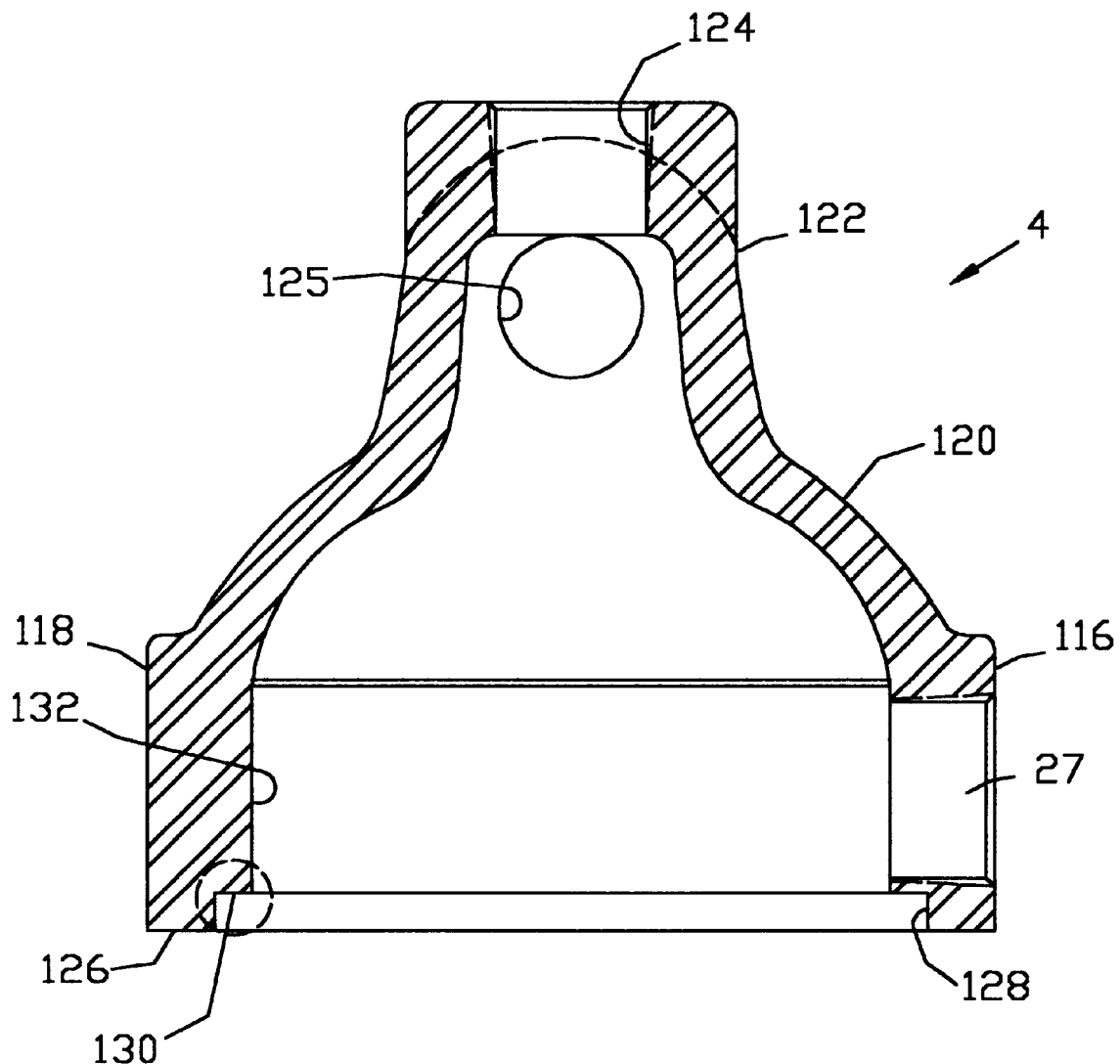
FIGS. 4A through 4C illustrate the upper section of the cooperating container of the present invention.
Figure 4B:
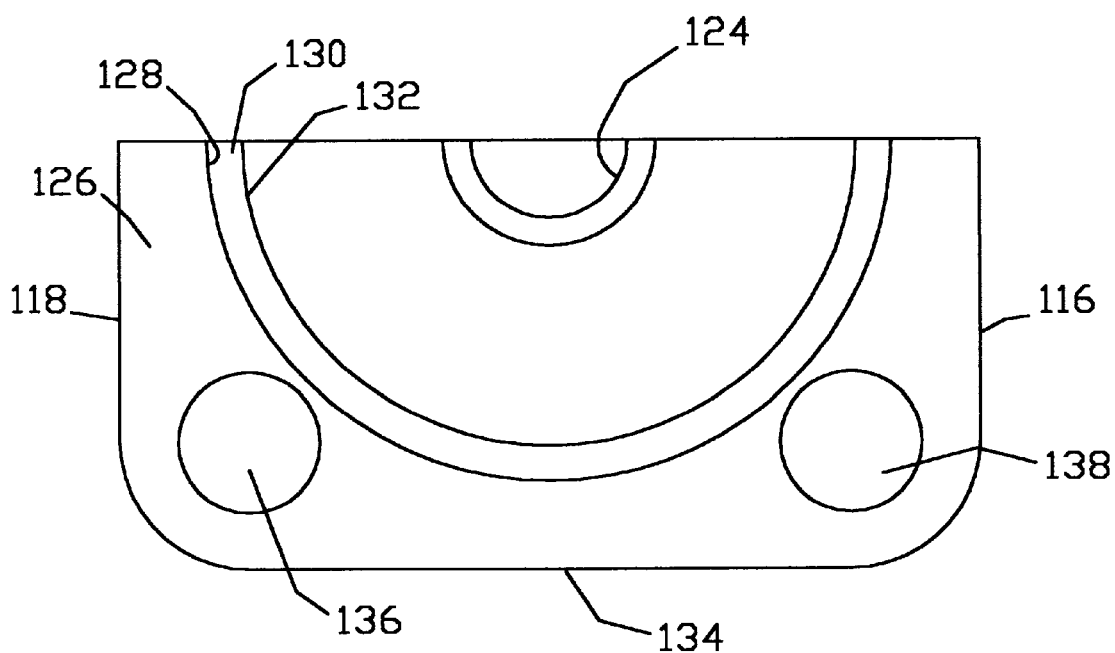
Figure 4C:
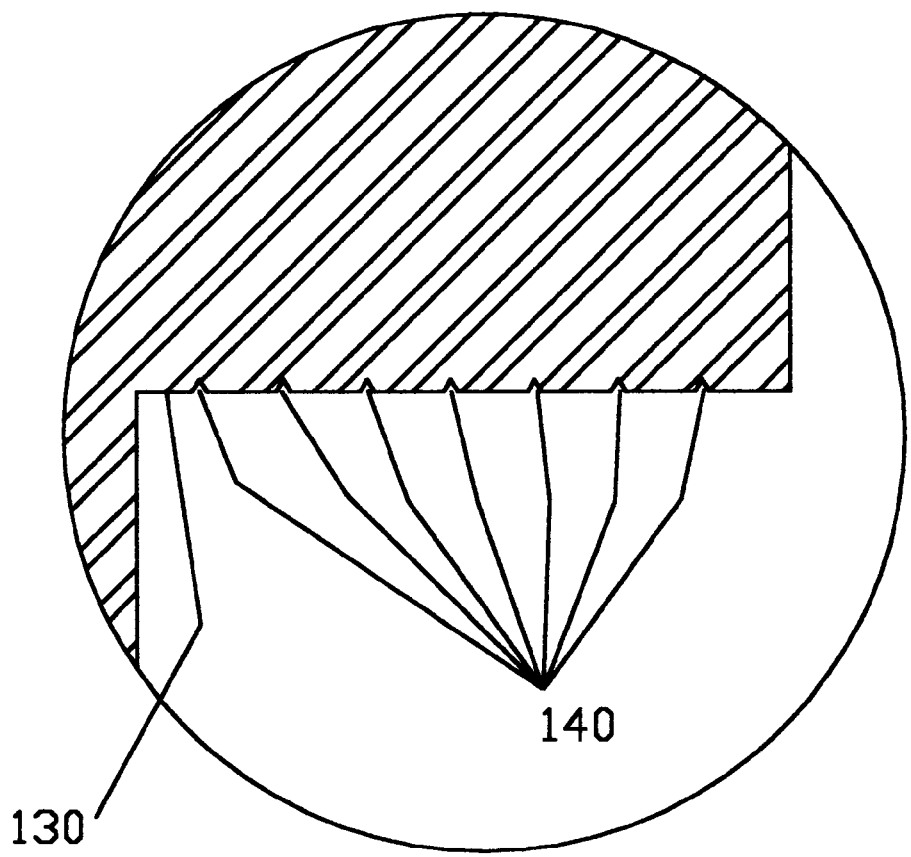

Referring now to FIGS. 4A–4C, the upper section 4 of the container of the present invention will now be described. As noted earlier, the outer portion of the lower 6 and upper section 4 are generally in a rectangular shape, with the sides 116 and 118 being shown in FIG. 4A, with the side 116 having the aperture 27. The sides 116 and 118 will lead to the tapered neck portion 120, with the tapered neck portion 120 tapering to a cylindrical surface 122, with the cylindrical surface 122 having a passage 124 and a passage 125 for communicating the effluent with the interior of the container. The sides 118, 116 of the upper section 4 in the opposite direction will lead to the radial surface 126 that in turn leads to the cylindrical surface 128. The cylindrical surface 128 will then terminate at the radial sealing surface 130 that in turn leads to the internal surface 132. The radial sealing surface 130 will be further described in FIG. 4C, but it should be noted that the sealing surface 130 will cooperate with the sealing surface 104.

With reference to FIG. 4B, the top view of the section 4 will now be described. The section 4 includes the previously described sides 116 and 118, and this view also depicts the side 134. Also depicted is the radial surface 126 that leads to the cylindrical surface 128 and in turn to the sealing surface 130. The figure also illustrates the openings 136 and 138 for placement of the bolt and nut means 8.

FIG. 4C is a magnification of the radial sealing surface 130. The sealing surface 130 contains a series of concentric serrated grooves 140. As stated earlier, the grooves 140 are a distance of 0.03 inches apart with a depth between 0.003 to 0.005 inches. In operation, a gasket is placed intermediate the surface 104 and the cooperating sealing surface of the upper section 4. Hence, the sealing of the two sealing surfaces is enhanced since the composition of the gasket may be pressed into the grooves 140, 114.

Figure 5:
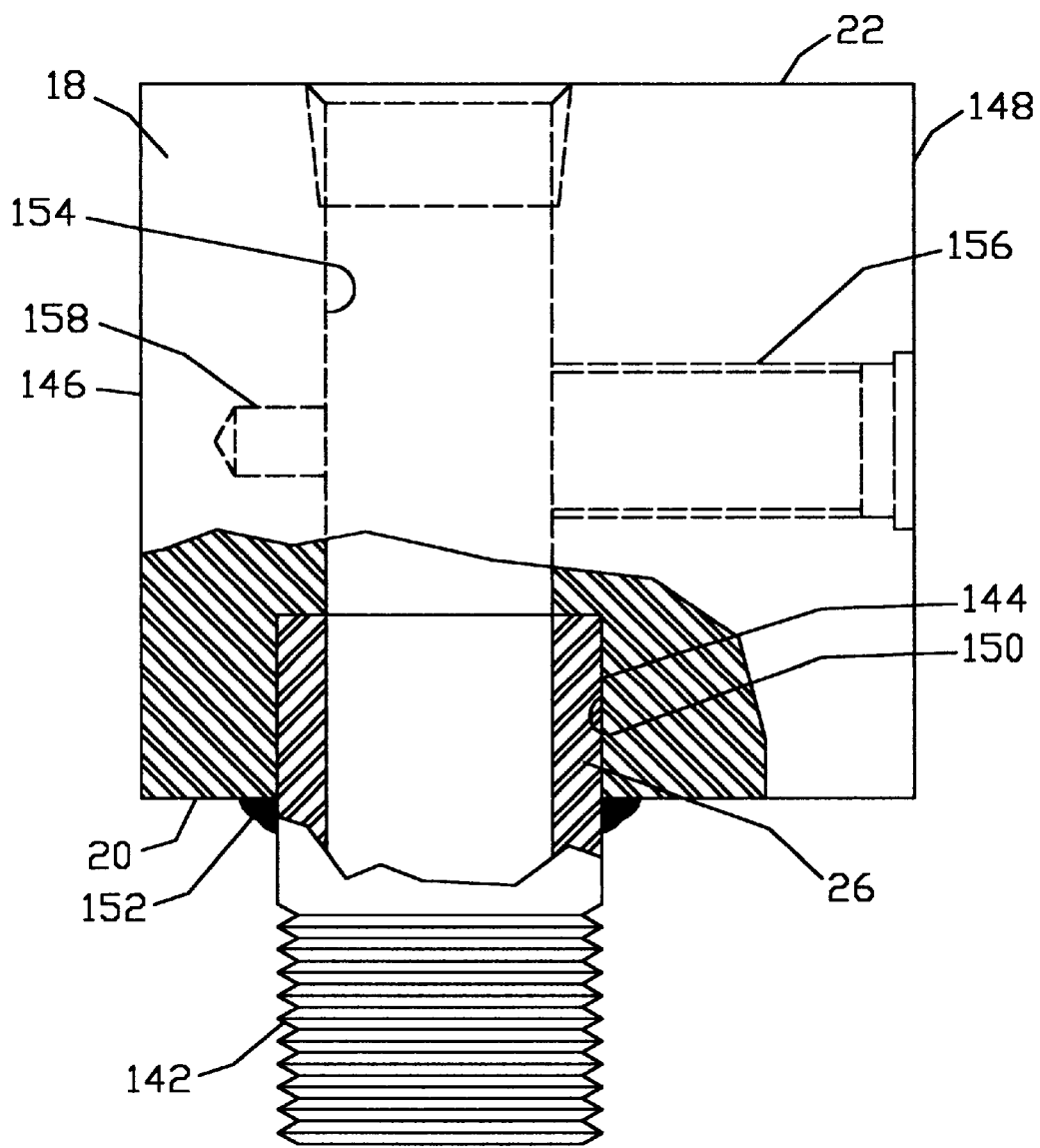
FIG. 5 is a partial cross-section of the block and collar members of the present invention.

Referring to FIG. 5, a partial cross-section of the preferred embodiment of the block 18 and collar member 26 of the invention is shown. The collar member 26 is a cylindrical member having a first end that contains thread means 142 and a second end that is a bore 144. The block 18 has the sides 20, 22 and FIG. 5 also shows sides 146 and 148. The side 20 has the opening 150 so that the bore 144 is received within said opening 150. The collar 26 is welded 152 into the block 18 as shown.

The bore 144 leads to a second bore 154 wherein the shaft 16, clamp 30, and nut 32 are received, with the bore 154 concluding with the previously described pipe plug 34. Another bore 156, which is perpendicular relative to the bore 154, is provided for placement of the moment arm 28, with the second bore 156 extending to a reduced bore 158 where the bushing of the moment arm 28 is placed.

Figure 6:
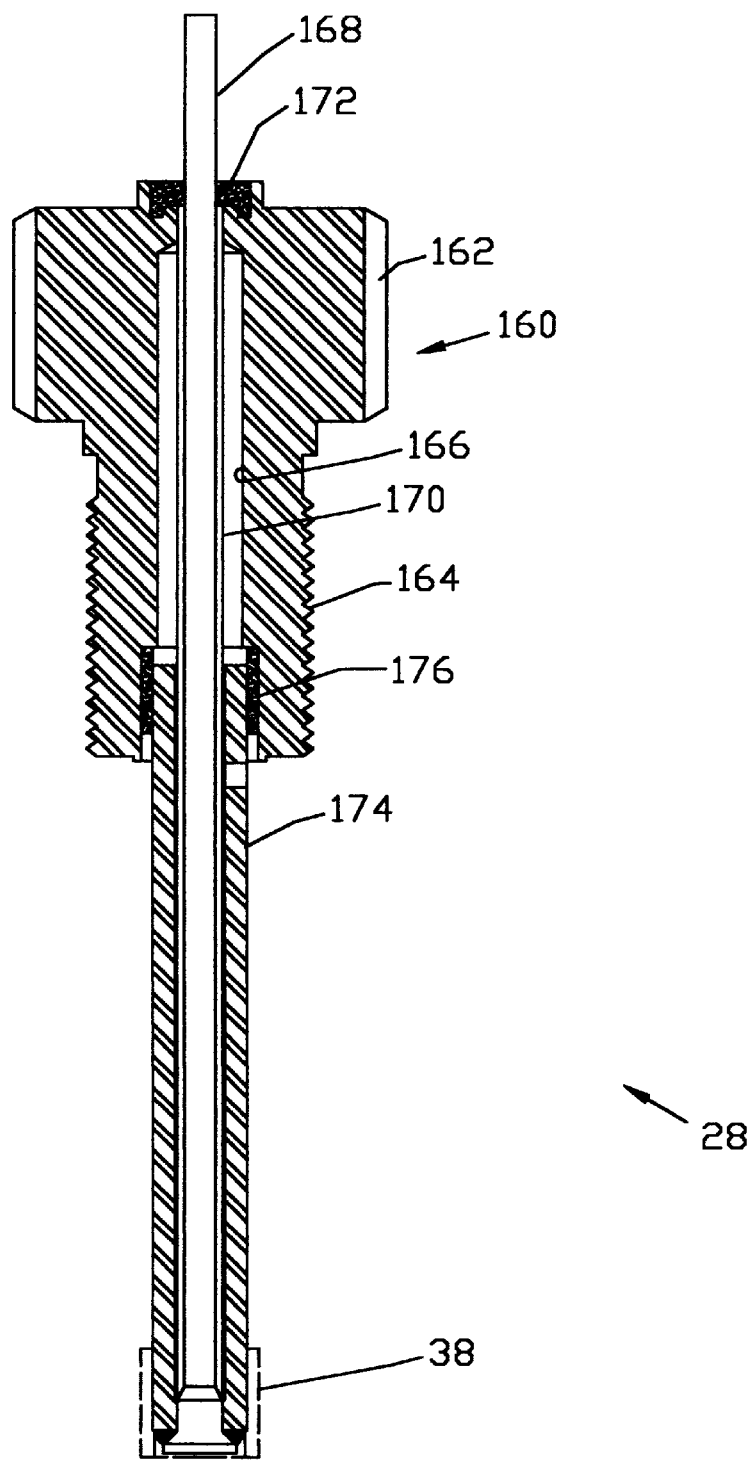
FIG. 6 is a cross-sectional view of the moment arm of the present invention.

With reference to FIG. 6, the moment arm 28 will now be described. The moment arm 28 contains the torque tube housing 160 that has a first enlarged hexed end 162 that in turn extends to the reduced end containing the external thread means 164. The moment arm 28 will have an internal bore 166. Thus, the internal bore 166 will have the torque rod 168 disposed therein, and placed concentrically about said torque rod 168 is the torque tube 170. The torque rod 168 has surrounding it on one end the bearing disc 172. The torque tube 170 will have disposed about it the clamping tube 174, with the clamping tube 174 being received within the bore 166 via the bushing 176, while on the opposite end, the bushing 38 will be received within the bore 158 of the block 18.

In operation of the level device as a high level switch (this is performed by placing the flapper and clamp assembly 48 on the opposite side of nozzle block assembly 56, as is well understood by those of ordinary skill in the art), the device 2 will be attached to process equipment via the inlet 111. The effluent will rise to a level within the container. The effluent will not be allowed to leak out due to the novel seal design. The sphere 14 will have a certain weight due to its density, and as noted earlier, the sphere 14 does not float in the effluent. Nevertheless, the effluent does generate a buoyant force on the displacer assembly 10. This will allow the displacer assembly 10 to be torqued upward by the torque tube relative to the container. The collar 26 will allow movement up to a predetermined distance in either the up or down axial direction. This is required to serve as a travel stop so that the weight of the displacer will not over-torque the torque tube.

As the displacer assembly 10 moves upward, the moment arm 28 will in turn cause the flapper and clamp assembly 48 to move upward, and thereafter, the flapper seat 50 will be no longer be in contact with the nozzle 52. After the flapper seat 50 is no longer in contact with the nozzle, the disconnection will allow, for instance, the escape of air. Alternatively, if the nozzle 52 was connected to an electrical supply, the electrical current will have been disrupted. The disruption of the air or electrical current may then signal another device. The device may be a shut-in valve; alternatively, the device may be an alarm. It should also be noted that the device is applicable to either a high level switch or a low level switch.

Figure 7:
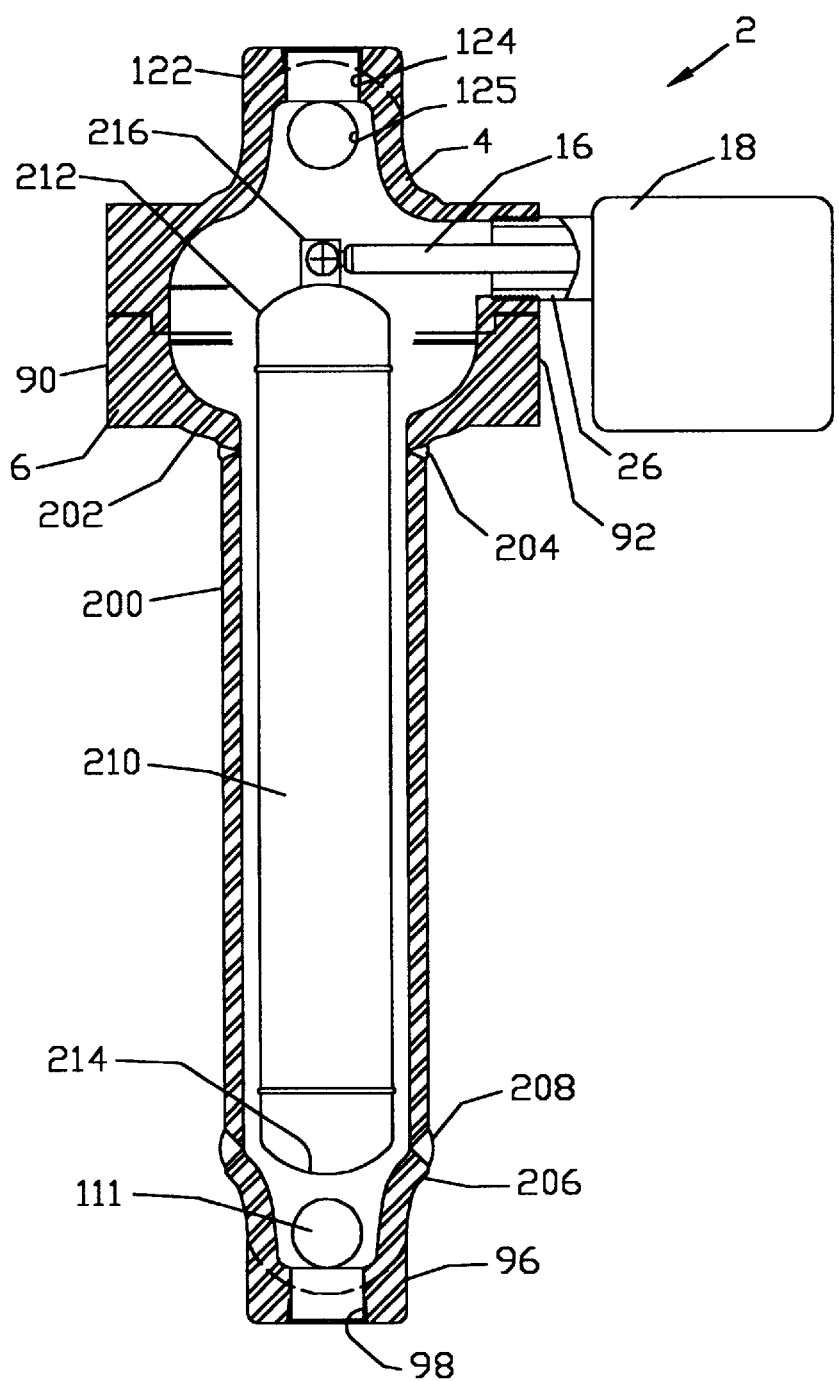
FIG. 7 is a cross-sectional view of a second embodiment of the present invention.

Referring now to FIG. 7, a second embodiment of the novel liquid level detecting device 2 will now be described. It should be noted that like numbers appearing in the various figures refer to like components. The first section 4, as previously described, includes the cylindrical surface 122 with the passage 124 and the passage 125. The passage 124 may be connected to a fill and drain line. The passage 125 may be fluidly connected to the vessel.

In this embodiment, the second section 60 has extending therefrom the cylindrical member 200. The second section 60 has the sides 90, 92 that continues to the neck portion 202, with the said cylindrical member 200 extending therefrom. The cylindrical member 200 is generally an elongated tubular member that may be attached to the second section 60 via conventional means such as welding, which is depicted at 204.

The cage member 200 will then continue to the neck portion 206 that in turn extends to the cylindrical surface 96. The cylindrical surface 96 contains the passage 98 as well as the passage 111. Generally, the passage 111 is fluidly connected to the vessel which the apparatus is being mounted to; the passage 98 may be connected to a piping that will allow fluid to be input or exited from the device 2. The cylindrical member 200 is also attached to the neck portion 206 via conventional means, such as welding 208.

The embodiment of FIG. 7 also depicts the displacer assembly 210, with the displacer assembly 210 being attached to the shaft 16 as previously described. The displacer assembly 210 is configured to be placed within the elongated member 200. In the preferred embodiment, the displacer 210 is a cylindrical member with ends 212 and 214. The end 212 has the arm 216 that is attached to the shaft 16. The displacer 210 may be constructed of the same materials that the displacer of FIGS. 1–6. The displacer 210 is generally in a cylindrical or spherical shape due to pressure forces acting on the displacer, but other shapes such as oblong or pear shape are possible.

Figure 8:
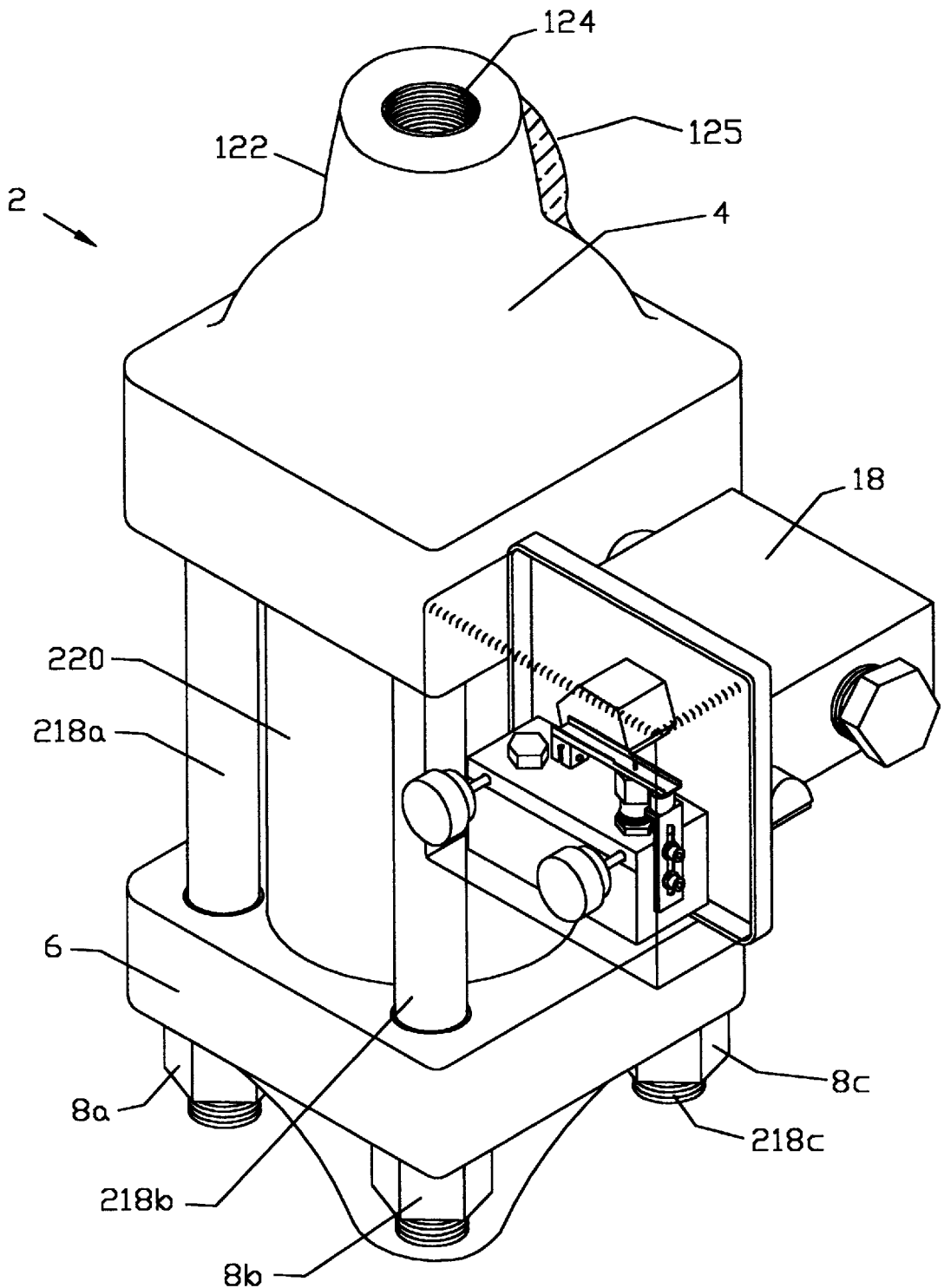
FIG. 8 is a perspective view of a third embodiment of the present invention.

The third embodiment of the present invention, which is the preferred embodiment of this application, will now be described with reference to FIG. 8. The flapper and clamp assembly 48 is configured in this embodiment for reading a low level. The first section 4 will have extending therefrom the bolts 218a, 218b, 218c (four bolts will be included, with only bolts 218a, 218b and 218c being shown). One end of the bolts will be connected to the first section 4 (via thread means, for example) and the other end of the bolts will extend through the second section 6. The nuts 8a, 8b, 8c will be attached to the second end of the bolts 218a, b, c respectively.

This embodiment depicts the cage member 220 that is positioned between the first section 4 and the second section 6. The bolts and nuts (8a, b, c and 218a, b, c) act to join the first section, second section and cage member 220 together. In the preferred embodiment, the cage 220 is a cylindrical member. The first section 4 will have a sealing face that will cooperate and seal with a sealing face of the cage 220; the second section 6 will have a sealing face that will cooperate and seal with the cage (not shown). A displacer similar to that depicted in FIG. 7 may be used with this embodiment.

Figure 9:
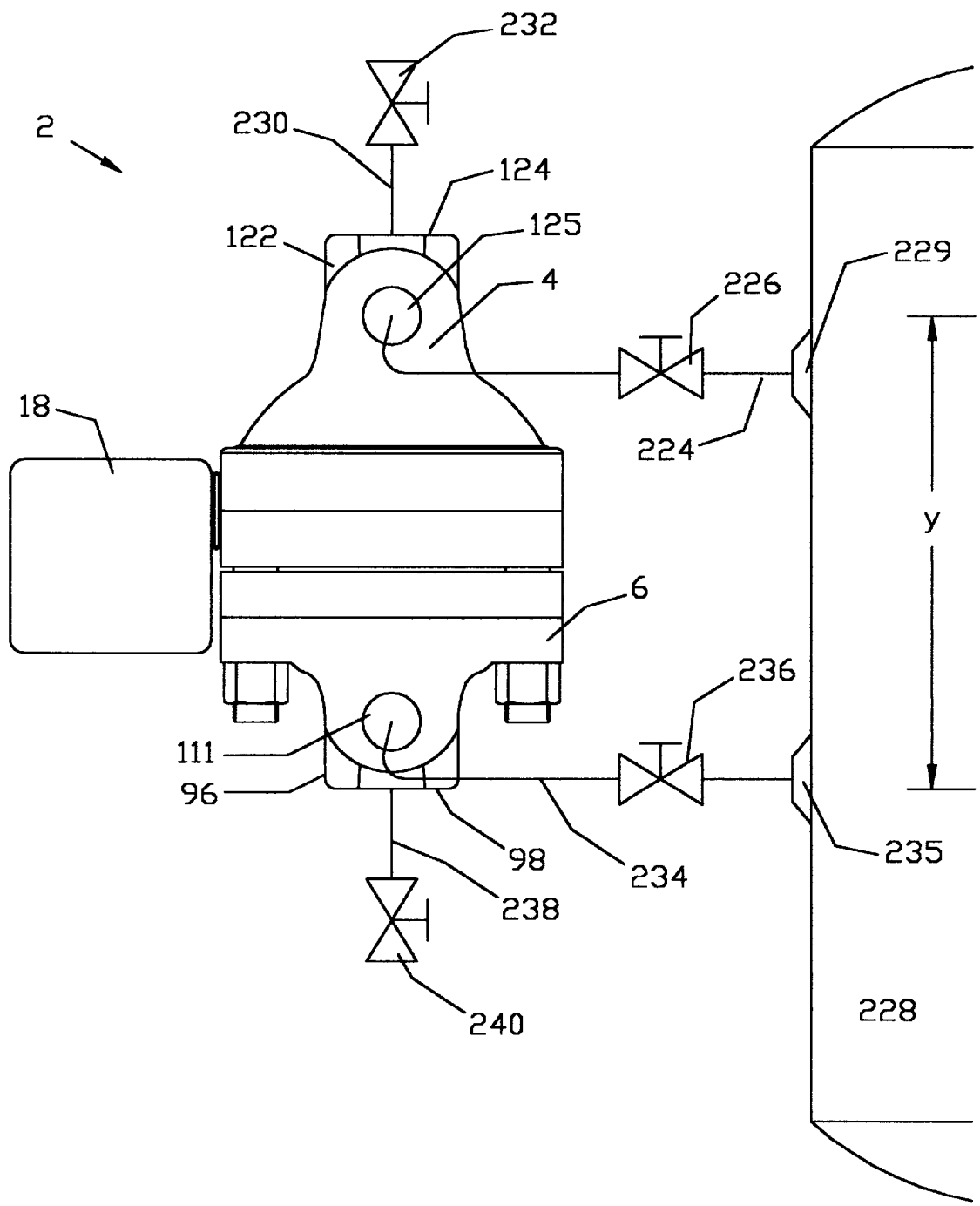
FIG. 9 is a schematic illustration of the first embodiment connected to a vessel.

Referring now to FIG. 9, a schematic illustration of the first embodiment of the present invention that is connected to a vessel will now be discussed. The device 2 has the passage 125 fluidly connected to a line 224, with the line 224 containing isolation valve 226 that has an open position and a closed position. The position of the line 224 relative to the vessel may represent a pressure equalizing line to allow the fluid to move freely inside the vessel 228. The line 224 is connected to the vessel 228 via the connection point 229, with the connection point being generally a fixed point relative to the vessel. The fluid within vessel 228 will not normally reach the level of line 224. In the embodiment shown in FIG. 9, the point ░A░ is the switching point for a high level switch i.e. the point wherein the displacer will signal the valve means. Note that in this embodiment as well as the prior art systems, point ░A░ is a fixed switching point for a system that is installed. In other words, the switching point level ░A░ can not be varied due to the fixed height structure of the container. The outlet 124 also has the line 230 that can serve as a fill and/or vent line for the device 2. The line 230 may also contain the isolation valve 232. Thus, the device 2 may be vented or drained as desired by the operator.

The passage 111 will be fluidly connected to the line 234, with the line 234 being fluidly connected to the vessel 228 at the connection point 235 which is a fixed point relative to the vessel 228. The line 234 will contain the isolation valve 236. This way, the fluid level within the vessel 228 is communicated to the internal chamber of the device as is well understood by those of ordinary skill in the art. The line 238 will also be included, with the line 238 fluidly connecting with the passage 98. The passage 98 may be used for draining the device. The line 238 may contain the isolation valve 240. In this embodiment, the distance between the passage 125 and passage 111 is a distance denoted as ░Y░. With prior art systems, the distance between passages 111 and 125 is a fixed distance and can not be varied.

Figure 10:
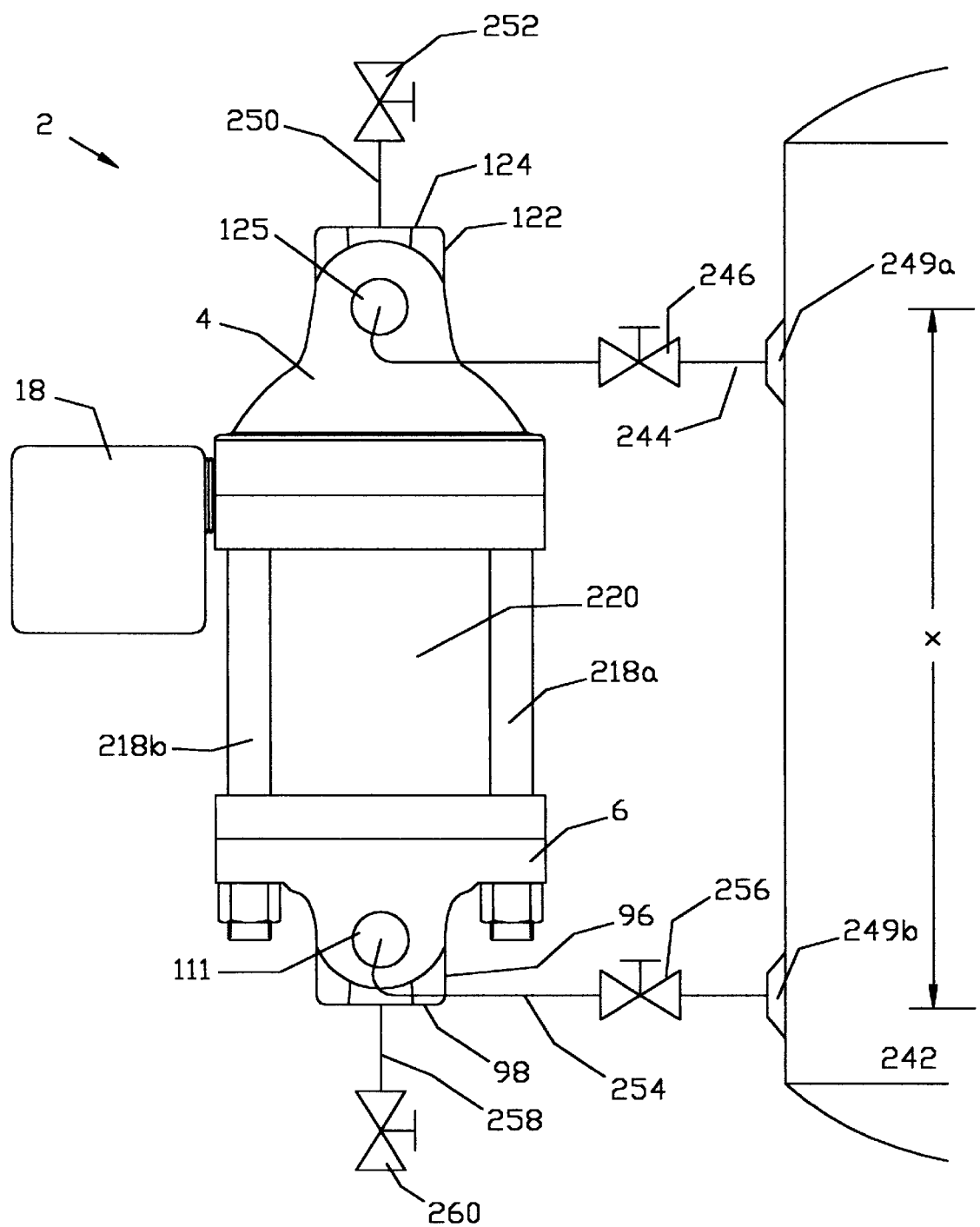
FIG. 10 is a schematic illustration of the second embodiment connected to a vessel.

In FIG. 10, a schematic illustration of the third embodiment (which is the preferred embodiment of this application) is connected to the vessel 242. This vessel 242 represents a different size vessel that will have different piping requirements, different fluid level requirements and different flow characteristics therethrough as will be understood by those of ordinary skill in the art. Thus, the variable length device 2 may be employed. The device 2 has the passage 125 fluidly connected to a line 244, with the line 244 containing isolation valve 246. The position of the line 244 relative to the vessel may represent the pressure equalizing line to allow the fluid to move freely inside the vessel.

According to the teachings of the present invention, the switching point may be at point "A". However, due to design considerations, the operator may prefer to have the switching point at level "B". This may be easily accomplished by varying the length of the displacer within the cage 220. As those of ordinary skill in the art will recognize, by varying the switching point level, the retention time of the effluent is also effected. Thus, the operator may manipulate the retention time by varying the length of the displacer within the cage 220.

FIG. 10 also depicts the line "X" which represents the distance from the passage 125 to 111. Note that in this vessel 242, the distance "X" is greater than the distance "Y" (of FIG. 9). Therefore, if the prior art design is used with a fixed switching point of "A", the operator would deem it necessary to install piping that would properly position the apparatus 2 such that the point "A" is at the correct level.

Further, the connection points 249A and 249B may be fixed points on the vessels. The novel design allows for use of the variable length level switch. Thus, the switching level "B" is chosen according to the proper process flow characteristics and not by piping restraints. The outlet 124 also has the line 250 that can serve as a fill and/or vent line for the device 2. The line 250 may also contain the isolation valve 252. As is also the case with the embodiment of FIG. 9, the device 2 may be vented or drained as desired by the operator.

The passage 111 will be fluidly connected to the line 254, with the line 254 being fluidly connected to the vessel 242. The line 254 will contain the isolation valve 256. This way, the fluid level within the vessel 242 is communicated to the internal chamber of the device as is well understood by those of ordinary skill in the art. The line 258 will also be included, with the line 258 fluidly connecting with the passage 98. As noted earlier, the passage 98 may be used for draining the device. The line 238 may contain the isolation valve 260. In this embodiment, the distance between the passage 125 and passage 111 is the distance denoted as "X".

The distance "X" is greater in length than "Y". The length from passage 125 to passage 111 is greater in length according to piping requirements of the particular vessel that the device is to be attached to for operation. Thus, the length "X" will vary depending on the particular circumstances of the vessel. In prior art systems, in order to use prior art level switches, a complicated manifold system would be required. With the teachings of the present invention, an operator need only fabricate the cylindrical member 220 to the proper length. The novel design allows standard first receptacles 4 and second receptacles 6 with a variable length member 220 to be sized according to design considerations.

It should be noted that these teachings are applicable to the embodiment of FIG. 7. The cylindrical member 200 is calculated and selected. The member 200 can then be welded at 204 and 208. Accordingly, the length between passages 125 and 111 can be varied depending on the piping requirements of the particular vessel. Also, standard first receptacle 4 and second receptacle 6 are employed so that fabrication, manufacturing, and installation cost are minimized.

Additionally, the length of the displacer 210 within either cage 220 or 210 may be varied depending on the desired level of activation of the switch. In other words, the operator may desire the displacer to extend the entire length of the cage or only partially into the cage depending on the level that is desired to be monitored within the vessel containing the effluent. The description and disclosure of this application are applicable to high level switches and low level swithces.

Changes and modifications in the specially described embodiments can be carried out without departing from the scope of the invention which is intended to be limited only by the scope of the appended claims.

We claim:

1. A device for signaling a predetermined height of an effluent, said device being fluidly connected to a vessel which allows for a retention time of the effluent within the vessel, said device comprising:

a top receptacle wherein said top receptacle includes a closed end and an opened end and wherein said top receptacle includes a first passage fluidly connected to the vessel;

an intermediate receptacle operatively attached with said top receptacle wherein said intermediate receptacle includes a first opened end and a second opened end so that said opened end of said top receptacle is attached to said first opened end of said intermediate receptacle;

a bottom receptacle operatively attached with said intermediate receptacle, wherein said bottom receptacle includes a closed end and an opened end so that said second opened end of said intermediate receptacle is attached to said opened end of said bottom receptacle;

and wherein said bottom receptacle includes a second passage fluidly connected to the vessel and wherein said top, intermediate and bottom receptacle comprise a container;

a displacer assembly being disposed within said intermediate receptacle, said displacer assembly having a shaft extending therefrom, said displacer assembly being responsive to the level of said effluent so that a switching point is created in the vessel effecting the retention time of the effluent;

and wherein said intermediate receptacle is a cylindrical member and wherein said displacer includes an elongated member configured to be disposed within said cylindrical member, said displacer assembly being sized to cooperate with the switching point in order to effect a desired retention time of the effluent;

a block attached to said top receptacle and a collar member operatively associated with said block, said collar member receiving said shaft;

a torque tube assembly perpendicularly attached to said shaft;

a flapper attachment, operatively associated with said torque tube assembly and responsive to a movement of said torque tube assembly;

valve means, operatively associated with said flapper attachment, for exhausting a supply source; and signal means, operatively associated with said valve means, for signaling the exhaustion of the supply source by said valve means to an alarm.

2. The device of claim 1 further comprising:

a first sealing face configured on said opened end on said top receptacle;

a second sealing face configured on said first opened end of said intermediate receptacle and a third sealing face configured on said second opened end of said intermediate receptacle;

a fourth sealing face configured on said opened end on said bottom receptacle;

a first gasket placed between said first sealing face and said second sealing face, and a second gasket placed between said third sealing face and said fourth sealing face.

3. The device of claim 2 wherein said signal means includes an air supply so that as said valve means disrupts the supply source, the air supply is exhausted.

4. The device of claim 3 wherein said signal means includes an electric supply so that as said valve means disrupts said supply source, the electric supply is disconnected.

5. The device of claim 4 wherein said top receptacle contains a third passage fluidly connected to a water supply line.

6. The device of claim 5 wherein said bottom receptacle contains a fourth passage fluidly connected to a drain line.

* * * * *